W. A. GREENLAW.
LAMP CONTROLLING DEVICE FOR MOTOR CARS.
APPLICATION FILED JAN. 3, 1911.
1,007,688.
Patented Nov. 7, 1911.
2 SHEETS—SHEET 1.
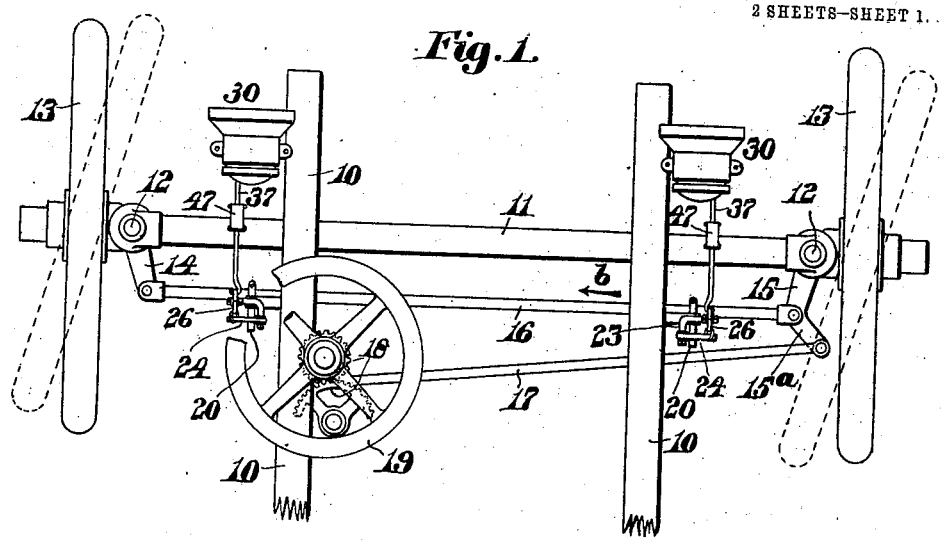
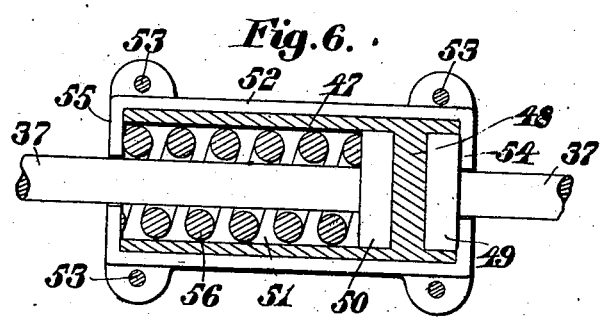
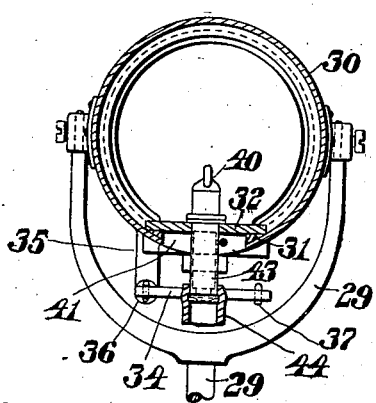
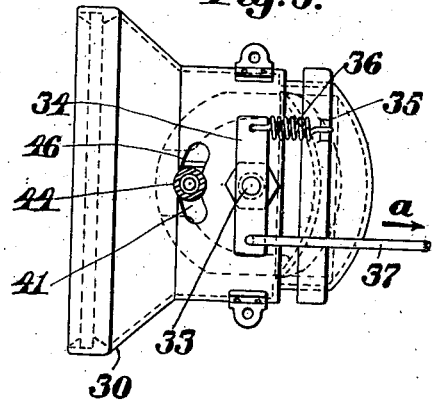
Witnesses:
Nathan C. Lombard
Mary C. Smith
Inventor:
Warren A. Greenlaw,
by Walter E. Lombard.
Atty.

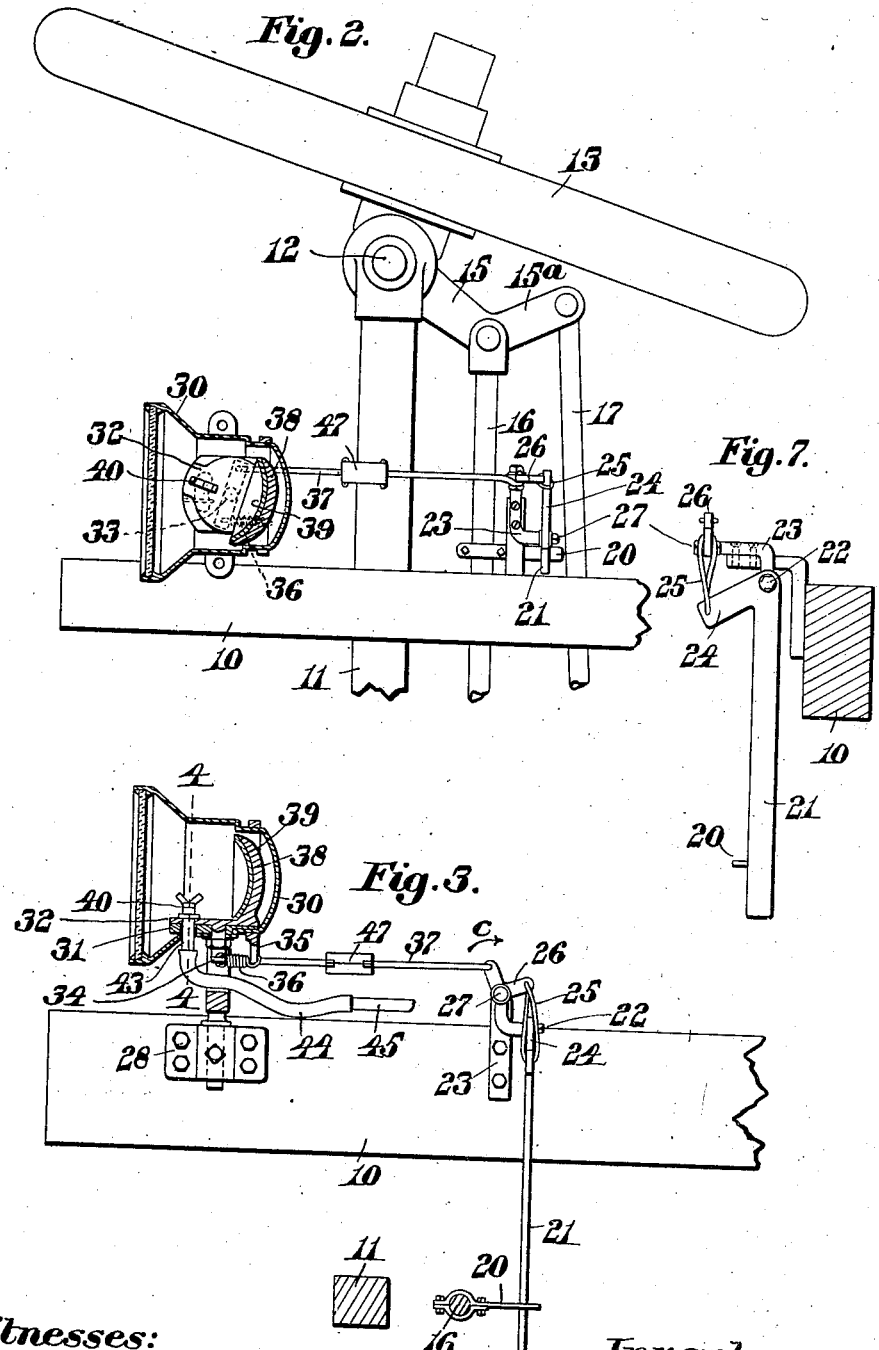

UNITED STATES PATENT OFFICE.

WARREN A. GREENLAW, OF MELROSE, MASSACHUSETTS.

LAMP-CONTROLLING DEVICE FOR MOTOR-CARS.

1,007,688.  Specification of Letters Patent.  Patented Nov. 7, 1911.

Application filed January 3, 1911. Serial No. 600,834.

*To all whom it may concern:*

Be it known that I, WARREN A. GREENLAW, a citizen of the United States of America, and a resident of Melrose, in the county of Middlesex and State of Massachusetts, have invented certain new and useful Improvements in Lamp-Controlling Devices for Motor-Cars, of which the following is a specification.

This invention relates to devices for operating the lamps of a motor car, and it has for its particular object the controlling of the reflector and burner of the lamps by means of the steering mechanism when the car is making a turn, so that the rays from one reflector will be projected in the direction in which the car is turning.

In many motor cars it is not practical to turn the lamp casing itself, and for this reason it has been found to be advantageous to mount the reflector and the burner on a movable support having a vertical pivot about which said support, carrying with it reflector and burner, may be moved to any desired angle from the horizontal axis of the lamp casing, this movement being effected by the operation of the steering mechanism, so that the rays from the reflector will light up the road over which the inner turning wheel will pass, the reflector of the other lamp being left in its normal position so that the rays therefrom will light up the path of the outer turning wheel.

The invention consists in certain novel features of construction and arrangement of parts which will be readily understood by reference to the description of the drawings and to the claims hereinafter given.

Of the drawings: Figure 1 represents a plan of a portion of a motor car frame, and its front steering wheels, showing mounted on said frame suitable lamps, the reflectors and burners of which are adapted to be moved about a vertical axis by the operation of said steering mechanism. Fig. 2 represents an enlarged plan of one steering wheel, and showing in section its adjacent lamp, and in plan the mechanism for operating the reflector thereof. Fig. 3 represents a section through the other lamp showing the reflector and burner operating mechanism in elevation. Fig. 4 represents a transverse section through one of the lamps, the cutting plane being on line 4, 4 on Fig. 3, said figure being drawn to an enlarged scale. Fig. 5 represents an inverted plan of one of the lamps, said figure being drawn to an enlarged scale. Fig. 6 represents a section through the yielding connection in the link interposed between the reflector support and the actuating mechanism therefor, and Fig. 7 represents an elevation of one of the devices for operating the reflector by the movement of the steering rod.

Similar characters designate like parts throughout the several figures of the drawings.

In the drawings, 10 represents a chassis or frame of a motor car, having secured at its front end the traverse member 11, to each end of which is pivoted at 12 the steering wheel 13, these wheels being turned about the pivot 12 by means of the arms 14 and 15 connected with one another by the link or rod 16. The arm 15 is provided with an extension 15ª, which is connected by the draw link 17 to the steering mechanism 18, all of usual construction. It is obvious that when the handwheel 19 of the steering mechanism is moved about its axis, the steering wheels 13 are moved about the pivots 12, this operation causing the link or rod 16 to be moved transversely of the body 10 of the car. Secured to the link 16 are two rearwardly extending fingers or arms 20. Each of these fingers or arms 20 is adapted to normally bear against a downwardly extending arm 21 of a lever pivotally mounted at 22 to a bracket 23 secured to the chassis or frame 10. The lateral arm 24 of this lever is connected by means of a link 25 with one arm of a bell crank lever 26, pivoted at 27 to the bracket 23. In a suitable bearing 28 secured to the chassis or frame 10 is mounted the member 29, in which is supported in the usual manner the lamp casing 30. To the inner lower face of the lamp casing 30 is secured a block 31 having a flat upper face upon which rests the supporting plate 32, this plate 32 being provided with a downwardly extending pivot member 33, to the lower end of which is secured in any well-known manner the oscillating member 34, having arms radiating in opposite directions from said pivot 33. Between the end of one arm of this oscillating member 34 and the lug 35 upon the lamp casing is interposed a spring 36, which normally retains said oscillating member 34 in the position shown in Fig. 5 of the drawings. The other arm of the oscillating member 34 is connected by means of the link 37 with the upwardly extending arm of the bell crank lever 26.

The plate 32 has an upward extension 38, to which is secured in any well-known manner the reflector 39, a burner 40 also being secured to said plate in such position that the center of its flame will be in front of the center of said reflector 39. The lamp casing 30 and its reinforcing block 31 are provided with a slot 41 extending therethrough. The burner 40 is provided with a tubular extension 43, which extends through the slot 41, and is connected by means of a flexible tubular member 44 with the fixed pipe 45 from any suitable source of gas supply. Extending transversely of the slot 41 is a pin or other member 46, adapted to limit the movement of the burner in one direction so that the tension of the spring 36 will normally retain the tubular extension 43 in contact therewith. By this means the reflector 39 will be normally positioned at right angles to the horizontal axis of the lamp casing with the burner 40 in the same vertical plane therewith. It is obvious, however, that when the link 37 is moved in the direction of the arrow a on Fig. 5 of the drawings, the reflector supporting plate 32 will be turned about its vertical axis against the tension of the spring 36, thus moving the reflector 39 and burner 40 into a position at an angle to the horizontal axis of the lamp so that the rays from the reflector will be projected at an angle to the chassis or frame 10. This movement, however, is only effected when the hand wheel 19 of the steering mechanism 18 is operated to turn the steering wheels 13 for the purpose of permitting the movement of the car in a new direction. When this movement of the wheels 13 is thus effected, the connecting rod 16 will be moved in the direction of the arrow b in Fig. 1, and the arm 20 thereon at the right of said figure will move the downwardly extending arm 21 about its pivot in the direction of said arrow, thereby moving its bell crank lever 26 in the direction of the arrow c on Fig. 3, and causing the support 32 to be moved about its pivot 33 simultaneously. It is self-evident, therefore, that at whatever angle the wheel 13 may be moved relative to the chassis 10, the reflector 39 and burner 40 will be moved in unison therewith so that the rays projected from the lamp will light the road in advance of said wheel, while the rays from the other lamp will continue to be projected directly in advance of the car itself.

In order to prevent injury to the reflector operating mechanism when too great a movement is accorded to the wheel steering mechanism, the link 37 is divided and provided with a yielding connection 47 between its two parts. This yielding connection 47 is preferably cylindrical, with a partition 48 therein, forming two chambers, in the smaller of which is positioned the head 49 of one part of the link 37, while a similar head 50 of the other part of the link 37 is positioned within the longer chamber 51. The member 47 is surrounded by a divided casing 52 secured together by suitable members 53, this casing 52 being provided with end plates 54 which prevent the removal of the head 49 from its chamber in the member 47. The opposite end of the casing 52 is similarly provided with end plates 55, having an opening therethrough for the free movement of the link 37, and between this end plate 55 and the head 50 is interposed within the chamber 51 a spring 56. This spring has sufficient tension to withstand all normal strains upon the link 37, so that any normal movement of the steering mechanism will immediately effect the movement of the reflector operating mechanism. Should, however, any abnormal strain be brought to bear upon the steering mechanisms, the spring 56 will be compressed sufficiently to allow the head 50 to move slightly away from the partition 48 and overcome any tendency to injure the various actuating mechanisms.

It is believed that the operation and many advantages of the invention will be fully understood without any further description.

Having thus described my invention, I claim:

1. In a device of the class described, the combination of a lamp casing; a reflector therein; a pivoted support therefor; a burner movable with said support; a rocker member; a connector between said rocker member and pivoted support; a pendant actuating member connected to said rocker member; and an arm secured to the steering rod adapted to operate said actuating member in its movement in one direction and thereby move said reflector support about its pivot to project its rays in the direction of movement of the car on which said lamp is mounted.

2. In a device of the class described, the combination of a lamp casing; a reflector therein; a pivoted support therefor; a burner movable with said support; a rocker member; a yielding connector between said rocker member and pivoted support; a pendant actuating member connected to said rocker member; and an arm secured to the steering rod adapted to operate said actuating member in its movement in one direction and thereby move said reflector support about its pivot to project its rays in the direction of movement of the car on which said lamp is mounted.

3. In a device of the class described, the combination of a lamp casing; a reflector therein; a support therefor having a pivot member extending downwardly through said casing; a radial arm secured thereto; a spring secured to said arm and normally retaining said reflector at right angles to the axis of said lamp; and means connected to said arm and operable by a movement in one direction of the steering rod of the car on which said lamp is mounted to move said reflector from said normal position.

4. In a device of the class described, the combination of a lamp casing having a slot therein; a reflector therein; a support therefor having a pivot member extending downwardly through said casing; a radial arm secured thereto; a spring secured to said arm and normally retaining said reflector at right angles to the axis of said lamp; means connected to said arm and operable by a movement in one direction of the steering rod of the car on which said lamp is mounted to move said reflector from said normal position; and a burner secured to said pivoted support provided with a supply pipe and extending through the slot in said casing.

5. In a device of the class described, the combination of a lamp casing having a slot therein; a reflector therein; a pivoted support for said reflector; a burner carried by said support and extending downwardly through said slot; a stop in said slot for limiting the movement of said burner in one direction; a spring coacting with said support for normally retaining said burner against said stop and the said reflector at right angles to the axis of said lamp; and means operable by the movement in one direction of the steering rod of the car on which said lamp is mounted to move said burner away from said stop and thereby cause the rays from said reflector to be projected in the new direction of movement of said car.

6. In a device of the class described, the combination of a lamp casing having a slot therein; a reflector therein; a support therefor having a pivot member extending downwardly through said casing; a radial arm secured thereto; a spring secured to said arm and normally retaining said reflector at right angles to the axis of said lamp; a rocker member; a connector between said rocker member and said radial arm; a pendant actuating member connected to said rocker member; an arm secured to the steering rod adapted to operate said actuating member in its movement in one direction and thereby move said reflector support about its pivot to project its rays in the direction of movement of the car on which said lamp is mounted; and a burner secured to said pivoted support provided with a supply pipe and extending through the slot in said casing.

Signed by me at 4 Post Office Sq., Boston, Mass., this 23d day of December, 1910.

WARREN A. GREENLAW.

Witnesses:
WALTER E. LOMBARD,
NATHAN C. LOMBARD.